United States Patent [19]
Kiel

[11] 3,760,881
[45] Sept. 25, 1973

[54] TREATMENT OF WELLS WITH FLUIDS CONTAINING COMPLEXES

[75] Inventor: Othar M. Kiel, Houston, Tex.

[73] Assignee: Esso Production Research Company, Houston, Tex.

[22] Filed: June 15, 1972

[21] Appl. No.: 263,081

Related U.S. Application Data

[63] Continuation-in-part of Ser. No. 146,349, May 24, 1971, Pat. No. 3,710,865, which is a continuation-in-part of Ser. No. 76,887, Sept. 30, 1970, abandoned.

[52] U.S. Cl. ............ 166/308, 166/307, 252/8.55 R
[51] Int. Cl. ....................... E21b 43/26, E21b 43/27
[58] Field of Search .............. 166/308, 307, 305 R, 166/274, 275; 252/8.55 R, 8.55 C, 316

[56] References Cited
UNITED STATES PATENTS

| | | | |
|---|---|---|---|
| 3,163,602 | 12/1964 | Lindblom et al. | 252/8.55 |
| 3,305,016 | 2/1967 | Lindblom et al. | 166/275 X |
| 3,417,820 | 12/1968 | Epler et al. | 166/308 |
| 3,422,890 | 1/1969 | Darley | 166/274 |
| 3,446,795 | 5/1969 | Boudreaux et al. | 252/8.55 R X |
| 3,475,334 | 10/1969 | Boudreaux | 166/308 X |
| 3,483,121 | 12/1969 | Jordan | 166/308 X |
| 3,615,794 | 5/1968 | Nimerick | 252/8.55 R X |
| 3,634,237 | 1/1972 | Crenshaw et al. | 252/8.55 R |
| 3,637,520 | 1/1972 | Schweiger | 252/316 |

*Primary Examiner*—Stephan J. Novosad
*Attorney*—James A. Reilly et al.

[57] ABSTRACT

A subterranean formation surrounding a wellbore is treated by injecting into the formation a water-based viscous fluid containing a complex produced by the reaction of an aliphatic quaternary ammonium compound with a water-soluble compound selected from the group consisting of monosaccharides, disaccharides, trisaccharides, polysaccharides, and long chain synthetic hydroxylated polymers which yield such complexes at a temperature between about 20°C and about 205°C or higher. The complexes permit the formation of emulsions and other viscous fluids which are more stable at elevated temperatures and in the presence of salts than those prepared with other materials and thus facilitate the treating of high-temperature formations not readily susceptible to treatment with other water-based fluids. Fluids containing the complexes are particularly useful as hydraulic fracturing fluids.

25 Claims, 5 Drawing Figures

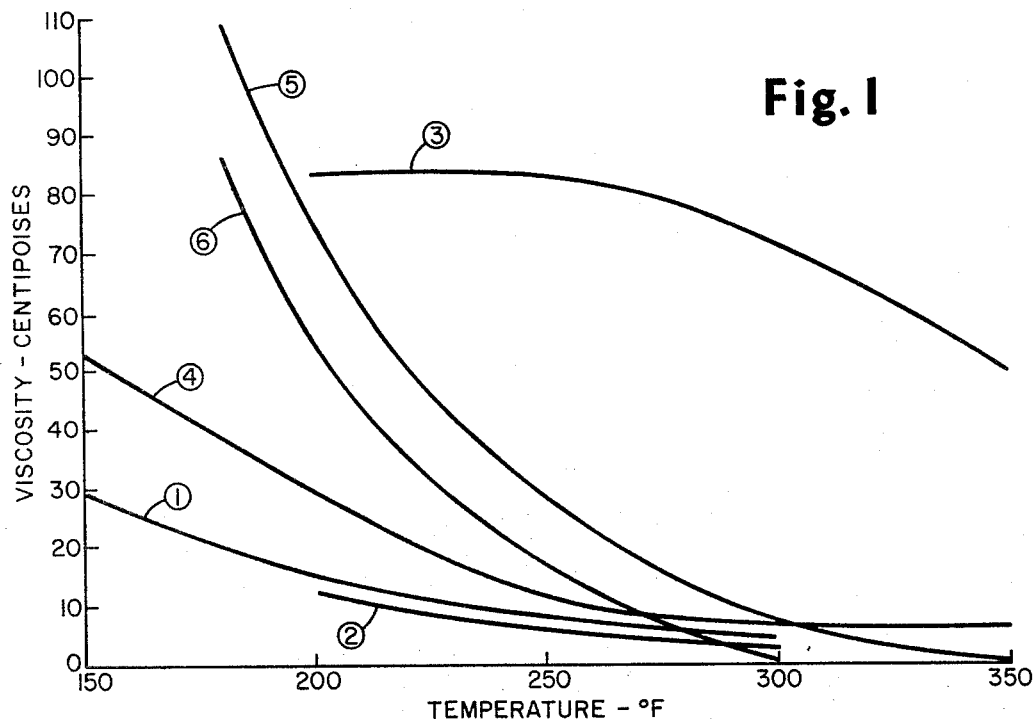
Fig. 1 TEMPERATURE STABILITY OF EMULSIONS
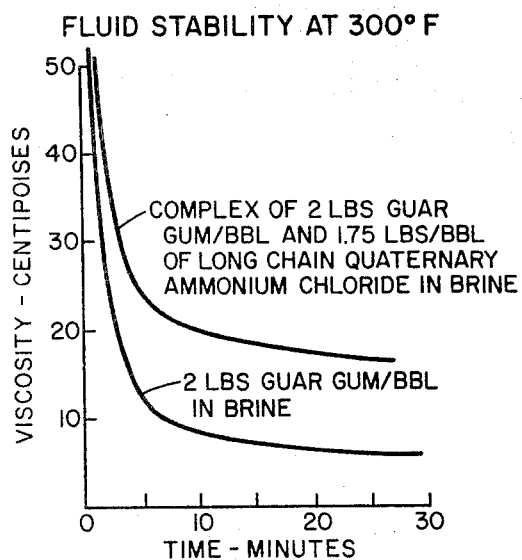
Fig. 2
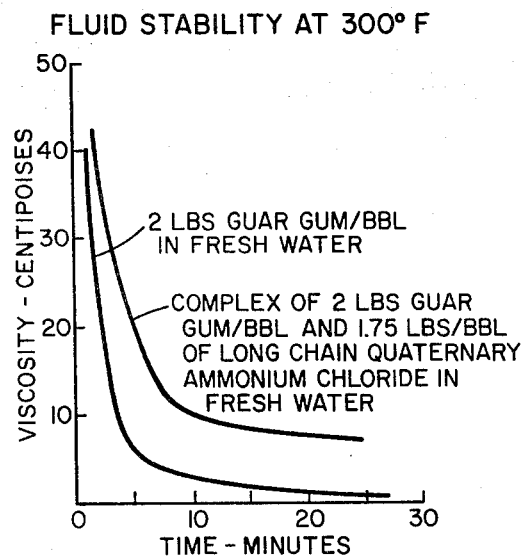
Fig. 3

TREATMENT OF WELLS WITH FLUIDS CONTAINING COMPLEXES

CROSS REFERENCE TO RELATED APPLICATIONS

This application is a continuation-in-part of application Ser. No. 146,349, filed in the U.S. Patent Office on May 24, 1971, now U.S. Pat. No. 3,710,865, which is a continuation-in-part of application Ser. No. 76,887, filed on Sept. 30, 1970, and now abandoned.

BACKGROUND OF THE INVENTION

1. Field of the Invention

This invention relates to the treatment of subterranean formations and to fluids for use in hydraulic fracturing and other well treating operations.

2. Description of the Prior Art

Hydraulic fracturing has been widely used as a means for improving the rates at which fluids can be injected into or withdrawn from subterranean formations surrounding oil wells and similar boreholes. The methods employed normally involve the injection of a viscous fracturing fluid having a low fluid loss value into the well as a rate sufficient to generate a fracture in the exposed formation, the introduction of fluid containing suspended propping agent particles into the resultant fracture, and the subsequent shutting in of the well until the formation is closed on the injected particles. This results in the formation of high-conductivity channels through which fluids can thereafter be injected or produced. The conductivity obtained is a function of the fracture dimensions and the permeability of the bed of propping agent particles within the fracture.

Experience has shown that the benefits obtained from hydraulic fracturing depend to a large extent on the properties of the fluid employed. Fluids used in the past include viscous crude oils and petroleum fractions, aqueous liquids containing thickening agents and other additives, and emulsions of various types. Certain oil-in-water emulsions containing polymeric thickening agents in the external phase have been recently found to be particularly effective. It has been shown that these fluids often permit the generation of wider fractures than can be obtained with gelled water fluids and other conventional systems, that they facilitate the transport and placement of high concentrations of relatively large propping agents needed for the formation of high-conductivity fractures, that they can be pumped into wells at the required rates without excessive friction losses in the tubing or casing, that the emulsion constituents can be readily removed from the formation following fracturing operations, and that such fluids have higher efficiencies and are considerably less expensive than many of the high-viscosity gelled fluids that have been widely used in recent years.

One factor which has limited the use of emulsions and other water-based fluids in hydraulic fracturing and other well treating operations has been the tendency of the additives used in such fluids to lose their effectiveness at elevated temperatures and in the presence of salts. It has been found that fluids prepared with conventional emulsifying agents, thickeners, and similar materials are often unstable in the presence of monovalent ions at temperatures of about 225°F or higher and may lack stability at even lower temperatures if divalent ions are present in significant quantities. This has limited the use of oilfield brines for the preparation of water-based fracturing fluids and similar compositions and has restricted the use of such compositions in deep, high-temperature wells, some of which have bottom hole temperatures of from 350° to 450°F or higher. Efforts in the past to find materials that will tolerate such temperatures, particularly in the presence of salts, have not been successful.

SUMMARY OF THE INVENTION

The present invention relates to improved well treating operations carried out with water-based fluids which have better stability than those available in the past. In accordance with the invention, it has now been found that aliphatic quaternary ammonium compounds can be reacted with water-soluble compounds selected from the group consisting of monosaccharides, disaccharides, trisaccharides, polysaccharides, and long chain synthetic hydroxylated polymers which will complex with the quaternary ammonium compounds, at temperatures between about 20°C and about 205°C or higher, to form complexes which can be used in turn to produce gels, emulsions and other water-based fluids that are surprisingly stable at elevated temperatures and in the presence of salts. Laboratory work and field tests have shown that these complexes permit the preparation of fluids which are suitable for use in well treating operations from water or brine and a variety of different hydrocarbon liquids, that such fluids have sufficient stability to permit their use in high-temperature wells where fluids employed in the past are often inadequate, and that such fluids have rheological properties and other characteristics which make them particularly effective in hydraulic fracturing and similar well treating operations. The injection of such a fluid into a subsurface formation surrounding a well at fracturing rates often results in the generation of a fracture with greater dynamic width and length than can be obtained with a conventional fluid under comparable conditions and frequently permits the treatment of formations that have been difficult or impossible to treat with fluids available in the past.

Experience has shown that complexes prepared by the reaction of long chain quaternary ammonium halides useful as cationic emulsifying agents with high molecular weight water-soluble polysaccharides such as guar gum or a similar galactomannan are particularly effective for purposes of the invention. The addition of naphtha, liquefied petroleum gases, kerosene, diesel oil or a similar low-viscosity hydrocarbon liquid to water or brine containing such a complex normally results in the formation of an oil-in-water emulsion which is quite stable at temperatures of 300°F and higher and is relatively unaffected by the presence of calcium and other divalent ions. These emulsions have made possible the fracturing of wells that are difficult at best to fracture with conventional fluids and have reduced the cost of treating such wells substantially.

BRIEF DESCRIPTION OF THE DRAWING

FIG. 1 in the drawing is a plot of viscosity vs. temperature for various fluids which shows the superiority of the fluids used in accordance with the invention over other fluids; and FIGS. 2 through 5 are plots of viscosity vs. time for various fluid systems which further demonstrate the improved characteristic of the fluids employed for purposes of the invention.

DESCRIPTION OF THE PREFERRED EMBODIMENTS

Figure 4:
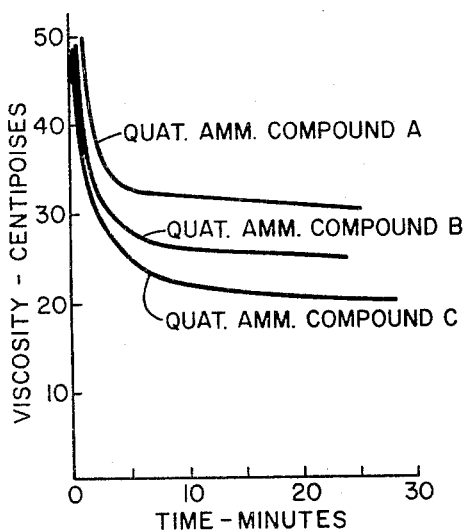

The improved well treating fluids employed for purposes of the invention are prepared with complexes formed by the reaction of aliphatic quaternary ammonium compounds with water-soluble compounds selected from the group consisting of monosaccharides, disaccharides, trisaccharides, polysaccharides, and long chain synthetic hydroxylated polymers which yield such complexes, under the conditions of the system, at temperatures in the range between about 20°C and about 205°C or higher. A variety of different quaternary ammonium compounds having alkyl, alkenyl or alkaryl substituents containing from about one to about 24 carbon atoms per substituent may be employed. These are preferably used in the form of the quaternary ammonium halides but in some cases hydroxides, sulfates, sulfonates and other derivatives may also be employed. Representative quaternary ammonium compounds that may be reacted with the water-soluble compounds include tetramethyl ammonium hydroxide, tetraethyl ammonium chloride, tetrapropyl ammonium chloride, tetrabutyl ammonium bromide, tripropyl methyl ammonium sulfate, dimethyl dihexyl ammonium chloride, diethyl dibutenyl ammonium chloride, dibutyl dioctadecyl ammonium chloride, trimethyl benzyl hydroxide, hexyltrioleyl ammonium hydroxide, dibenzyl dihexadecyl ammonium sulfonate, trimethyl cyclohexyl ammonium chloride, didodecyl dicyclopentyl ammonium chloride, trimethyl eicosyl ammonium chloride, and the like. The quaternary ammonium compounds containing from about 16 to about 48 carbon atoms per molecule are generally preferred.

Also useful for purposes of the invention are quaternary ammonium compounds containing substituent groups derived from naturally-occurring materials such as coconut oil, tallow, soybean oil and the like. Such compounds normally contain from 1 to 3 methyl groups and 1 or more long chain aliphatic substituent groups. One example of such a substituent group is the coco group derived from coconut oil. This group consists of long chain aliphatic radicals containing from about 10 to about 18 carbon atoms. A typical analysis shows about 4.0 percent $C_{10}$ radicals, about 55.5 percent $C_{12}$ radicals, about 14.0 percent $C_{16}$ radicals, and about 4.0 percent $C_{18}$ radicals. The tallow group normally consists primarily of saturated and unsaturated $C_{16}$ and $C_{18}$ radicals; while the soya group is made up of saturated and unsaturated $C_{16}$ to $C_{18}$ radicals in somewhat different proportions. Representative of the quaternary ammonium compounds containing mixed substituent groups are trimethyl tallow ammonium hydroxide, dimethyl dicoco ammonium chloride, dimethyl soyzbenzyl ammonium chloride, diethyl tallow hexyl ammonium sulphate, methyl trisoya ammonium hydroxide and the like.

A particularly effective class of long chain quaternary ammonium conpounds useful for purposes of the invention is made up of the long chain quaternary ammonium halides prepared by the alkylation of primary amines having aliphatic groups of from about eight to about 20 carbon atoms in length, secondary amines containing $C_8$ to about $C_{20}$ aliphatic substituents, and polymeric fatty acid amines having aliphatic substituents up to about eight carbon atoms in length with methyl chloride or the like in a low-boiling alcohol or similar solvent containing a base such as sodium hydroxide or a mixture of sodium hydroxide and sodium bicarbonate. Quaternary ammonium halides produced in this manner are marketed commercially for use as cationic emulsifiers. Such materials can be obtained in various grades, depending on the lengths of the aliphatic substituent groups, the percent active ingredients present, the solvent employed, and other factors. They generally have hydrophilic-lipophilic balance values between about 8 and about 18. Among the cationic emulsifiers found especially useful for purposes of the invention are the water-soluble tallow-based quaternary ammonium chlorides available from Enjay Chemical Company, Houston, Texas, under the designation "Corexit 8596". The asphalt emulsifier sold by Armour Industrial Chemical Company, Chicago, Illinois, under the tradename "Redicote E-11" is also useful. Other cationic emulsifiers include the alkyl ammonium halides in which one alkyl group contains from about six to about 18 carbon atoms and the other substituents attached to the nitrogen atom or hydrogen atoms are alkyl groups of from one to four carbon atoms in length. It will be understood, of course, that all long chain quaternary ammonium compounds are not equally effective for purposes of the invention and that some will therefore normally give better results than others.

The water-soluble compounds with which the quaternary ammonium compounds are reacted to form the complexes employed for purposes of the invention are selected from the group consisting of monosaccharides, disaccharides, trisaccharides, polysaccharides, and long chain synthetic hydroxylated polymers which yield complexes under the conditions of the system. It has been shown that quaternary ammonium compounds are capable of reacting with a wide variety of different water-soluble materials containing anionic exchange groups or radicals to which the cationic portion of the quaternary ammonium compounds may attach. These groups include primary hydroxyl groups, secondary hydroxyl groups, carboxyl groups, carbonyl groups and the like. Representative examples of materials containing such groups of radicals that may be employed for purposes of the invention include monosaccharides, disaccharides, and trisaccharides such as glucose, mannose, galactose, fructose, arabinose, lactose, sucrose, raffinose, and the like. Also suitable are water-soluble polysaccharides of vegetable, animal or microbial origin, including both the structural and nutrient types. Examples of these materials include suitable derivatives of vegetable nutrient polysaccharides such as starches and inuline, amylose and amylopectin for example; derivatives of vegetable structural polysaccharides such as celluloses, xylans, pectins, algins, and galactomannans; natural gums such as gum karaya, gum tragacanth, and the like; animal polysaccharides such as glycogens, chitins, and mucopolysaccharides; and microbial polysaccharides such as levans, dextrans, the polysaccharides produced by bacteria of the genus Xanthomonas; and polymers produced by molds such as *Sclerotium Glucanicum*, *Corticium Rolfsii* and the like. Other materials that can be used include long chain synthetic polymers containing hydroxyl groups and other radicals through which the quaternary ammonium compounds can be formed. Examples of these include the partially hydrolyzed polyacrylamides, polyvinylalcohols, polyvinyl carboxylic acids neutralized with amines and bases, polyacrylic acids, and the like. Mixtures of these and similar materials can also be used. Some of these materials, of course, are presenty too expensive for use on a routine basis. The preferred materials, both from the standpoint of performance and cost, include the readily available water-soluble polysaccharides and polysaccharide derivatives such as guar gum, carboxylmethylcellulose, hydroxyethylcellulose, and carboxymethylhydroxyethylcellulose. Guar gum has been found to be particularly effective for purposes of the invention.

The reaction of the quaternary ammonium compounds with the water-soluble hydroxy compounds to produce the complexes employed for purposes of the invention may be carried out in either aqueous or oleaginous media. If an aqueous medium is employed, it is normally preferred to first add the quaternary ammonium compound to water or brine in a concentration between about 0.001 and about 5 percent by weight. The polysaccharide or other water-soluble compound is then added in a concentration between about 0.001 and about 5 percent by weight and the solution is agitated to promote uniform dispersion of the materials in the solution. Reaction of the materials to form the complex normally occurs rapidly. Depending upon the particular reactant selected and the conditions employed, it may be accompanied by an increase in the viscosity of the solution or precipitation of the complex. Experience has shown that complexing of the quaternary ammonium compounds with high molecular weight water-soluble polymers often results in a formation of a product which does not have sufficient hydrophilic groups to render it soluble in fresh water but that such materials can generally be solublized in brine. Brines are generally employed for the preparation of water-base fluids to be used in hydraulic fracturing and other well treating operations because of the deleterious effect of fresh water on many subterranean formations. The fact that the complexes obtained with certain starting materials may not be soluble in fresh water is therefore not a serious drawback.

The process described above is generally used for the preparation of water-based fluids that are to be used in hydraulic fracturing and other well treating operations. By preparing the complex in the water or brine to be employed in the field, the necessity for recovering and handling the complex can be avoided. If desired, however, the soluble complexes can be precipitated from aqueous media in which they are prepared by adding methanol, ethanol, or a similar low molecular weight alcohol to the media. The precipitates thus obtained, as well as precipitates which are formed naturally on reaction of the starting materials, can be recovered by decanting, filtration or centrifugation. These can then be washed with alcohol or the like to remove any unreacted materials that may be present, dried at low temperature, and packaged for later use.

If an oleaginous medium is employed for preparation of the complex, the polysaccharide or other hydroxy compound is first dispersed in kerosene, a light mineral oil or a similar fluid. The quaternary ammonium compound is then added and the reaction medium is stirred to promote effective contact between the two reactants. The concentrations in which the two materials are employed may be varied considerably but it is normally preferred to use the materials in approximately equal quantities by weight. The reaction can generally be accelerated by heating the oil. The occurrence of the reaction is generally accompanied by a change in the appearance of the materials and the formation in the bottom of the reaction vessel of the particulate solid which is readily identifiable. The reaction in oil or a similar medium normally takes place over a period ranging from a few minutes to an hour or more, depending upon the particular reactants selected. The complex formed can be recovered from the reaction mixture by decanting, filtration, or centrifugation, washed with alcohol or a solvent to remove the remaining oil, and then dried and packaged. In some cases, it may be desirable to crush the product particles to a fine powder to facilitate later use in a water-based fluid but this step is not always necessary.

Depending upon the particular starting materials selected, the complexes prepared as described above may be employed for thickening aqueous fluids to be used in hydraulic fracturing and other well treating operations or used for the formation of emulsions to be employed in such operations. It has been found that the complexing of guar gum and similar polymers useful as thickening agents with the quaternary ammonium compounds improves the heat stability and thickening effectiveness of such polymers and in some cases may also reduce adsorption on subterranean formations. Similarly, the complexing of quaternary ammonium compounds useful as emulsifying agents with the water-soluble compounds generally results in a significant improvement in the performance of the emulsifiers at high temperatures and in the presence of divalent salts. By properly selecting the starting materials, it is thus possible to prepare a variety of different complexes which are particularly suited for use in various types of oilfield stimulation operations.

The complexing of guar gum and similar high molecular weight water-soluble polysaccharides with long chain quaternary ammonium compounds which have hydrophilic-lipophilic balance values between about 8 and about 18 results in a particularly useful class of materials that may be employed both as thickening agents in fluids substantially free of oil and as emulsifiers in oil-water systems. Experience has shown that these complexes have excellent stability at elevated temperatures and in the presence of calcium and other divalent salts and that they can therefore be used for the preparation of viscous solutions and emulsions having properties superior to those of many of the fluids employed in the past.

Water-based fracturing fluids and other well treating agents containing the complexes prepared as described above can be prepared without special equipment. If the complex has been formulated in an aqueous medium and not precipitated, other constituents required for the desired water-based fluid can simply be added in the necessary concentrations. These constituents may include acids, corrosion inhibitors, fluid loss control agents, wetting agents, diverting agents, and other additives commonly used in acidizing and acid fracturing fluids; oils, fluid loss control agents, propping agents, salts, gel breakers, friction reducers, and other materials frequently used in hydraulic fracturing operations; and other conventional additives that may be useful in workover fluids, completion fluids, and similar oilfield formulations. Stable oil-in-water emulsions containing the complexes can be readily prepared by adding naphtha, liquefied petroleum gases, kerosene, diesel oil, lease crude oil, or a similar hydrocarbon liquid of relatively low viscosity to the water or brine containing the complex and agitating the fluid, either by means of mixers or similar devices or by circulating it through a pump or blender. If a dried complex is used, similar procedures can be employed after the dried material has been solublized in water in the necessary concentration.

The procedures to be employed in well stimulation operations carried out with fluids containing the complexes will depend upon the particular type of operation contemplated. In acidizing operations where the complexes are to be employed for thickening an aqueous fluid which is to be injected into the formation in advance of the acid, for example, this aqueous fluid is normally prepared by adding the quaternary ammonium compound and polysaccharide or similar material to brine in approximately equal concentration of from about 2 to about 4 pounds per barrel and allowing the additives to react as described above. The resulting viscous solution is then injected into the well under a pressure sufficient to part the exposed formation. After the viscous fluid has been injected and a fracture extending away from the wellbore has been formed, a solution of hydrochloric acid or the like is introduced into the fracture containing the viscous fluid. The injected acid channels through the viscous solution within the fracture so that little reaction of the acid with the surrounding carbonate formation takes place until the acid reaches the outer ends of the fracture. This permits the transport of unreacted acid over much greater distances than can normally be obtained in ordinary acidizing operations. The injected acid may be followed with a brine afterflush to displace it away from the wellbore. After injection of the acid and afterflush have been completed, the well may be shut in overnight and then placed on production. The increase in permeability obtained as a result of the reaction of the acid with the formation normally results in a significant increase in the production rate.

In hydraulic fracturing operations in which the complexes are used for the formation of stable emulsion fracturing fluids, a brine preflush containing fluid loss agents will normally first be injected to break down the formation. An emulsion prepared from field brine and kerosene, lease condensate or other oil is then generally employed. This emulsion is normally produced by adding guar gum or a similar water-soluble polymer and a quaternary ammonium chloride cationic emulsifier or similar compound to the brine. The brine containing these materials and the oil are mixed to form the emulsion as the fluids are pumped through the blender and into the well. A fluid loss agent may be incorporated into the initial portion of the emulsion which is injected as a pad and serves to extend the fracture. After the pad has been injected, the introduction of sand or other propping agent particles into the fluid in the blender is commenced. The sand concentration is normally increased step-wise up to about 4 pounds or more per gallon. After the required volume of emulsion containing the propping agent has been put away, the wellbore may be flushed with kerosene, lease condensate or other fluid and the well shut in. The emulsion thus injected into the formation gradually breaks during the shut in period. Thereafter, the well can be opened and returned to production. The constituents employed to form the emulsion are readily produced back into the wellbore and hence the cleanup time is normally very short. The flow rate during the cleanup period is generally somewhat higher than the production rate prior to treatment of the well and usually increases substantially as the emulsion constituents are displaced by the formation fluids.

Hydraulic fracturing operations in which the complexes are used as thickening agents in oil-free fluid systems, acid fracturing operations wherein the complexes are employed to stabilize oil-acid emulsions, acidizing operations in which the complexes serve to build viscosity in the acidizing solutions, and other well treating operations may be carried out by using procedures generally similar to those described above. As indicated earlier, the precise steps to be employed in such operations will depend in part on the nature of the particular operation to be carried out and need not be described in detail to permit an understanding of the invention.

The invention can be further illustrated by considering the results of laboratory tests carried out with complexes prepared from various quaternary ammonium compounds and water-soluble polysaccharides and related materials and field tests of oilfield stimulation processes using such complexes in aqueous solutions and emulsions.

EXAMPLE I

In a first series of laboratory tests, complexes were prepared by reacting approximately equal parts by weight of a commercial long chain quaternary ammonium chloride, marketed by Armour Industrial Chemical Company, Chicago, Illinois, under the tradename "Redicote E-11" for use as a cationic asphalt emulsifying agent, with various polysaccharides and other related materials in an oil environment. The reactions were carried out by adding the starting materials to samples of a light mineral oil and then heating the samples to a temperature of about 200°F while providing agitation. As the complexes formed, they accumulated at the bottoms of the beakers as light yellow granular materials which were quite different in appearance from the starting materials added to the oil. The reaction times ranged from a few minutes to about 30 minutes. The reaction products thus obtained were recovered by decanting the oil, washed, and then tested to determine whether they would build viscosity in fresh water, a synthetic 10 pounds per gallon oilfield brine, and dilute hydrochloric acid. The polysaccharides and related materials employed and the results of the solubility tests with the resulting complexes are shown in the table set forth below.

TABLE I

Reaction of Polysaccharides and Related Materials with Quaternary Ammonium Chloride

| Polymeric Starting Material | Complex Built Viscosity in | | |
|---|---|---|---|
| | Fresh Water | Brine | HCl |
| Commercial grade of guar gum marketed for use in oilfield operations | Yes | Yes | Yes |
| Hydroxyethyl cellulose marketed for use in oilfield operations | Yes | Yes | Yes |
| Polyacrylamide marketed as a thickening agent in oilfield operations | No complex recovered | | |
| Commercial starch | No complex recovered | | |
| Sugar (sucrose) | Soluble but little effect upon viscosity | | |
| Polysaccharide produced by *Xanthomonas Campestris*, marketed for use in oilfield drilling muds | No complex recovered | | |

It can be seen from the results set forth in the above table that the guar gum, hydroxyethyl cellulose, and sucrose readily reacted with the quaternary ammonium chloride to form complexes. The other materials either did not form complexes under the particular conditions employed or formed complexes in insufficient quantities to permit their recovery. The reaction products obtained with the guar gum and hydroxyethyl cellulose were soluble in fresh water, brine and hydrochloric acid and appeared to be excellent viscosity builders. Such materials may be employed as thickening agents in a variety of aqueous fluids employed in oilfield well treating operations. The complex obtained with sucrose, on the other hand, was soluble in the fresh water, brine and acid but in the concentrations used had very little effect upon the viscosities of the fluids. Other tests with this material showed that it had good emulsifying properties and permitted the formation of more stable oil-in-water emulsions than were obtained with the quaternary ammonium chloride alone. Although complexes were not recovered from the oil samples in which the polyacrylamide, and the bacterial polysaccharide produced by *Xanthomonas Campestris* were used, later tests indicate that reaction products formed with these materials can be recovered as precipitates under somewhat different reaction conditions.

EXAMPLE II

Following the tests described above, a second series of experiments in which the quaternary ammonium chloride referred to above was reacted with guar gum, hydroxyethyl cellulose, polyacrylamide, and the polysaccharide produced by *Xanthomonas Campestris* were carried out in brine. In each case the polymer was added to a sample of the brine and allowed to hydrate. The qauternary ammonium chloride was then added in approximately the same concentration by weight and the sample was agitated to promote intimate mixing of the reactant materials. All four of the polymers readily was found that the guar gum readily reacted with the quaternary ammonium compound in fresh water to form a soluble complex that gave a substantial increase in viscosity over that obtained with the guar gum alone. Hydroxyethyl cellulose, the polyacrylamide, and the polysaccharide produced by *Xanthomonas Campestris* all reacted with the quaternary ammonium chloride to form precipitates. As indicated earlier, tests have shown that such precipitates are useful as thickening agents in fluids prepared from oilfield brines. Although all of the tests described up to this point were carried out with the same quaternary ammonium chloride, it has been found that similar reactions occur with other water-soluble quaternary ammonium compounds. Although the exact mechanisms involved are not fully understood, it has been suggested that the chlorides and similar compounds are first hydrolyzed to form the corresponding hydroxides and that these then react with the polysaccharides and related materials. Regardless of the mechanism, the results obtained demonstrate that the complexes can be formed with a variety of different starting materials having diverse physical and chemical properties.

EXAMPLE IV

In still another series of experiments, oil-in-water emulsions were prepared using a complex of the type employed for purposes of the invention and various combinations of emulsifying agents and polymers which do not react to form such complexes. The samples tested were prepared by first adding the polymers to water or brine in the required concentrations and allowing them to hydrate, introducing the emulsifying agents, mixing the resulting solutions with samples of kerosene in a ratio of 2 parts of oil to 1 part of aqueous solution, and then agitating the mixtures to produce the emulsions. The materials employed in each of the test emulsions are shown in the table set forth below.

TABLE II
Compositions of Oil-In-Water Emulsions [1]

| Emulsion No. | Emulsifying agent | Polymer | Other constituents |
|---|---|---|---|
| 1 | 1.75 lb./bbl. commercial nonionic emulsifier [2] | 2.0 lb./bbl. guar gum | 7 lb./bbl. KCl. |
| 2 | 1.0 lb./bbl. commercial anionic emulsifier [3] | 0.5 lb./bbl. guar gum, 1.0 lb./bbl. polyacrylamide. | 7 lb./bbl. KCl, 0.1 lb./bbl. FeSO$_4$, pH adj. to 8. |
| 3 | 1.75 lb./bbl. long chain quaternary ammonium chloride.[4] | 2.5 lb./bbl. guar gum | Brine, 7 lb./bbl. KCl, 0.1 lb./bbl. FeSO$_4$, pH adj. to 8. |
| 4 | 2.1 lb./bbl. long chain quaternary ammonium chloride.[4] | 0.5 lb./bbl. guar gum, 1.0 lb./bbl. hydroxyethylcellulose. | 7 lb./bbl. KCl, 0.1 lb./bbl. FeSO$_4$. |
| 5 | 2.4 lb./bbl. commercial nonionic emulsifier [2] | 0.5 lb./bbl. guar gum, 1.5 lb./bbl. hydroxyethylcellulose. | 7 lb./bbl. KCl, 0.1 lb./bbl. FeSO$_4$, pH adj. to 8. |

[1] All fluids were prepared with 2 volumes of kerosene and 1 volume of water.
[2] "Nalco AP-401," marketed by Nalco Chemical Company, Chicago, Illinois.
[3] "Alipal CD-128," marketed by GAF Corporation, New York, New York.
[4] "Redicote E-11," marketed by Armour Industrial Chemical Company, Chicago, Illinois.

reacted with the quaternary ammonium chloride to form smooth, clear solutions having higher viscosities than the brine samples containing the polymers alone. A subsequent test with the complex formed with the polysaccharide produced by *Xanthomonas Campestris* showed that this complex could be readily precipitated by the addition of methanol or a similar low molecular weight alcohol and resolublized in fresh water to produce a viscous fluid. This provides a convenient means for handling and storing the complex.

EXAMPLE III

Still another series of laboratory experiments similar to those described above was carried out using fresh water in place of the brine or oil employed earlier. It Samples of each of the emulsions prepared as described above were then tested at various temperatures in a temperature bath with a Model 50B Fann Viscometer. The viscosity of each emulsion was measured at temperatures between 150°F and 350°F and plotted aas shown in FIG. 1 of the drawing. It can be seen from the FIGURE that Emulsion 3 was markedly superior to the other fluids. This composition, prepared by reacting guar gum and a long chain quaternary ammonium chloride marketed as a cationic asphalt emulsifier to form a complex and then adding kerosene to produce the emulsion, had a viscosity of about 80 centipoises at 250°F and about 50 centipoises at 350°F. The next best material was Emulsion 4, which contained a complex of the same quaternary ammonium chloride with a mixture of guar gum and hydroxyethylcellulose in a lower concentration. Although this fluid underwent a rapid loss in viscosity as the temperature was increased from 150°F to about 250°F, the viscosity remained relatively constant between about 250°F and 350°F. The remaining fluids were prepared with emulsifiers which do not react with the long chain polysaccharides to form complexes and had essentially no viscosity at temperatures of 350°F. These data demonstrate the superior high temperature properties of the fluids employed for purposes of the invention and show that the complexes permit the preparation of emulsions which are relatively stable at temperatures of 350°F and higher.

EXAMPLE V

To To further demonstrate the superior thickening powers of the materials employed for purposes of the invention, samples of a commercial guar gum marketed for use in oilfield operations and a complex of this same material with a long chain coconut oil based quaternary ammonium chloride emulsifier available from Enjay Chemical Company, Houston, Texas, as "Surfactant 8549" were prepared. The guar gum was added to a sample of a synthetic brine having a density of 10 pounds per gallon in a concentration of 2 pounds per barrel. The complex was prepared by adding guar gum to a separate brine sample in the same concentration and then reacting this with 1.75 pounds per barrel of the long chain quaternary ammonium chloride. The two samples were then tested with a Model 50B Fann Viscometer in a temperature bath maintained at 300°F for a period of about 30 minutes. The sample containing only the guar gum lost viscosity rapidly during the first 5 minutes and at the end of the 30 minute period had a viscosity of only about 7 centipoises. The sample containing the complex of guar gum and the long chain quaternary ammonium chloride also showed a rapid viscosity loss initially but at the end of about 30 minutes still had a viscosity of about 17 centipoises. This is shown in FIG. 2 in the drawing. These data demonstrate that formation of the complexes improves the heat stability of polymeric thickening agents and thus permits the use of guar gum and similar water-soluble polysaccharides as thickeners in brines at higher temperatures than might otherwise be feasible.

EXAMPLE VI

FIG. 3 in the drawing illustrates the results of a test in fresh water similar to that shown for a brine system in FIG. 2. It can be seen that the guar gum sample lost essentially all of its viscosity after about 27 minutes at a temperature of 300°F and that the sample containing the complex of guar gum and the long chain quaternary ammonium chloride still had a viscosity of about 7 centipoises after about 25 minutes at 300°F. Although both samples were less stable in fresh water than in the brine used to obtain the data of FIG. 2, the sample containing the complex was again significantly better than that containing the guar gum alone.

EXAMPLE VII

A further series of tests similar to those of FIGS. 2 and 3 was carried out with complexes prepared from three different quaternary ammonium compounds. The results of these tests are shown in FIG. 4 of the drawing. Quaternary ammonium compound A was a cationic emulsifier available from Enjay Chemical Company, Houston Texas, under the tradename "Enjay LD-29108"; quaternary ammonium compound B was a cationic asphalt emulsifier marketed under the tradename "Redicote E-5" by Armour Industrial Chemical Company, Chicago, Illinois; and quaternary ammonium compound C was a similar cationic asphalt emulsifier marketed by Armour Industrial Chemical Company under the tradename "Redicote E-11". In each case the guar gum was used in a concentration of 2 pounds per barrel and the cationic emulsifier was employed in a concentration of 1.75 pounds per barrel. None of the systems contained any oil. It can be seen from FIG. 4 that all three quaternary ammonium compounds gave relatively high viscosities at the 200°F test temperature and that the formation of the complexes improved the performance of the guar gum in brine. The data also show that all quaternary ammonium compounds are not equally effective for purposes of the invention and that certain materials will therefore be preferred.

EXAMPLE VIII

Figure 5:
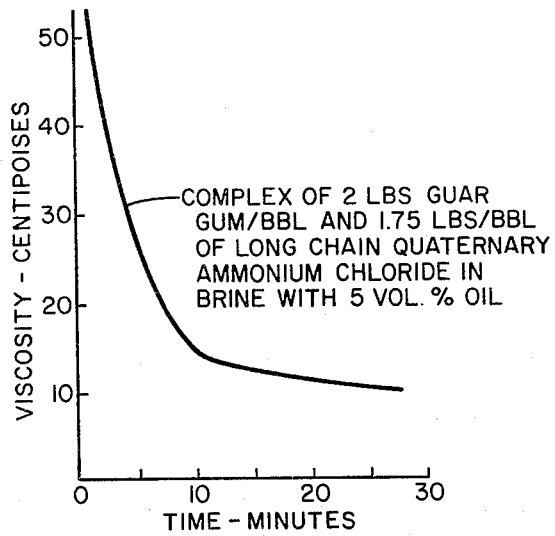

FIG. 5 in the drawing shows the results of still another test in which 2 pounds per barrel of guar gum was complexed with 1.75 pounds per barrel of a long chain quaternary ammonium chloride, Enjay LD-29108, in brine and 5 percent oil by volume was added to the system. The viscosity of the resulting fluid was measured at 300°F during a 30 minute test period. The data show that the system had good stability, even though the presence of the oil may have caused some loss in viscosity. The complexes employed for purposes of the invention thus permit the formulation of a variety of different fluids useful in oilfield well treating operations.

EXAMPLE IX

Following the tests described above and other laboratory work, a hydraulic fracturing field test was carried out using a complex of guar gum and a long chain quaternary ammonium chloride marketed by Enjay Chemical Company of Houston, Texas, as a cationic emulsifier under the tradename "Corexit 8596". The well in which the field test was carried out was a deep gas well in South Texas which did not have enough pressure to produce into the sales line. Analysis of the well indicated that a substantial increase in production could probably be obtained if an effective hydraulic fracturing operation could be carried out. A fracturing operation which called for the injection of about 58,000 pounds of 20–40 mesh sand in an oil-in-water emulsion prepared from field brine and lease condensate was designed.

The emulsion fracturing fluid to be used in the test was prepared with three 500-barrel tanks. One of these tanks was filled with field brine containing from 30 to 40,000 parts per million of sodium chloride. The other tanks were filled with lease condensate. Ten gallons of ammonium hydroxide was added to each of the condensate tanks to neutralize any acids present. One thousand pounds of guar gum and two 55-gallon drums of "Corexit 8596" were added to the brine to give a guar gum concentration of 2 pounds per barrel and a quaternary ammonium chloride concentration of about 1.75 pounds per barrel. The brine containing the guar gum and quaternary ammonium chloride was then circulated through the blender and back into the tank until the constituents had been thoroughly mixed and a complex of the guar gum and quaternary ammonium compound had been formed in the brine. No difficulties in forming the complex were encountered.

Following preparation of the brine solution containing the complex as described above, the fracturing operation was commenced by injecting into the well at fracturing rates 250 barrels of salt water containing a commercial fluid loss agent in a concentration of 20 pounds per 1,000 gallons. The pressure increased rapidly and then dropped off as this fluid was injected, indicating that the formation had been broken down and that a fracture had been initiated. Once this had been accomplished, preparation and injection of the emulsion were started. The brine containing the guar gum-quaternary ammonium chloride complex and the lease condensate were pumped into the blender from the brine and condensate tanks, mixed continuously, and injected into the well as a smooth, tight emulsion. A fluid loss agent composed of equal parts of a commercial fluid loss material and silica flour were added to the system at the blender in a concentration of 20 pounds per barrel. Injection of the emulsion containing the fluid loss agent was continued until a pad of 36,000 gallons had been injected to extend the fracture to the desired dimensions. The introduction of sand at the blender was then started. Simultaneously, the concentration of the fluid loss agent was reduced to a level of 10 pounds per gallon. The concentration of the sand used as the propping agent was increased from 1 pound per gallon to about 4 pounds per gallon during injection of the first 4,000 gallons of sand-containing emulsion. A total of 22,000 gallons of emulsion containing a total of 58,000 pounds of sand was injected into the well and lease condensate was then used to flush down the wellbore and the perforations. After this had been done, the well was shut in and let stand overnight.

On opening the well to restore production following the shut-in period, gas was initially produced at the rate of about 800,000 cubic feet per day. During the first six hours of production, 600 barrels of water and lease condensate were produced. The gas production rate continued to increase as the well cleaned up and leveled out at about 1.2 million cubic feet per day.

I claim:

1. A method for the treatment of a subterranean formation surrounding a wellbore which comprises injecting into said formation a fluid containing a complex prepared by the reaction of an aliphatic quaternary ammonium compound with a water-soluble compound selected from the group consisting of monosaccharides, disaccharides, trisaccharides, polysaccharides, and long chain synthetic hydroxylated polymers which yield such complexes at temperatures between about 20°C and about 205°C and thereafter producing fluids from said formation into said wellbore.

2. A method as defined by claim 1 wherein said water-soluble compound is a galactomannan.

3. A method as defined by claim 1 wherein said water-soluble compound is sucrose.

4. A method as defined by claim 1 wherein said water-soluble compound is a polysaccharide.

5. A method as defined by claim 1 wherein said water-soluble compound is hydroxyethylcellulose.

6. A method as defined by claim 1 wherein said water-soluble compound is a polysaccharide produced by bacteria of the genus Xanthomonas.

7. A method as defined by claim 1 wherein said quaternary ammonium compound is a quaternary ammonium chloride.

8. A method as defined by claim 1 wherein said quaternary ammonium compound contains from about 16 to about 48 carbon atoms per molecule.

9. A method as defined by claim 1 wherein said quaternary ammonium compound contains from 1 to 3 methyl groups and at least one long chain aliphatic group.

10. A method as defined by claim 1 wherein said quaternary ammonium compound is a cationic emulsifier having a hydrophilic-lipophilic balance value between about 8 and about 18.

11. A method for the hydraulic fracturing of a subterranean formation surrounding a wellbore which comprises injecting into said formation at fracturing rates a viscous fluid containing a complex produced by the reaction of an aliphatic quaternary ammonium compound and a water-soluble polysaccharide and thereafter producing fluids from said formation into said wellbore.

12. A method as defined by claim 11 wherein said viscous fluid is an oil-in-water emulsion.

13. A method as defined by claim 11 wherein said viscous fluid is an emulsion containing oil as the internal phase and an acid as the external phase.

14. A method as defined by claim 11 wherein said quaternary ammonium compound is a cationic emulsifier and said polysaccharide is guar gum.

15. A method as defined by claim 11 wherein an acid solution is injected into said formation behind said viscous fluid prior to producing fluids from said formation.

16. A method for the hydraulic fracturing of a subterranean formation surrounding a wellbore which comprises reacting an aliphatic quaternary ammonium compound and a water-soluble polysaccharide in an aqueous medium to produce a complex, injecting said medium containing said complex into said formation at a rate sufficient to open a fracture in the formation, and thereafter producing fluids from said formation into said wellbore.

17. A method as defined by claim 16 wherein said quaternary ammonium compound is a quaternary ammonium chloride and said polysaccharide is a guar gum.

18. A method as defined by claim 16 wherein an oil is added to said aqueous medium prior to injecting said medium.

19. A method as defined by claim 18 wherein said oil is added as said medium is pumped into the well.

20. A method as defined by claim 18 wherein about two volumes of oil are added for each volume of said aqueous medium.

21. A method for the treatment of a subterranean formation surrounding a wellbore which comprises reacting an aliphatic quaternary ammonium compound and guar gum to produce a complex, injecting an aqueous medium containing said complex into said formation through said wellbore, and thereafter producing fluids from said formation into said wellbore.

22. A method as defined by claim 21 wherein said quaternary ammonium compound is a quaternary ammonium chloride containing tallow groups.

23. A method as defined by claim 21 wherein said aqueous medium is an oil-internal emulsion.

24. A method as defined by claim 21 wherein said aqueous medium is injected at fracturing pressure.

25. A method as defined in claim 21 wherein said quaternary ammonium compound is a quaternary ammonium chloride containing coco groups.

* * * * *